United States Patent [19]

Kehl et al.

[11] Patent Number: 4,998,781
[45] Date of Patent: Mar. 12, 1991

[54] BRAKE DEVICE FOR A HYDRAULIC VEHICLE BRAKE SYSTEM

[75] Inventors: Georg Kehl; Heinz Siegel, both of Stuttgart; Helmut Deringer, Boeblingen; Dietmar Rischen, Korntal-Muenchingen; Andreas Abbing, Ludwigsburg; Alfred Bullinger, Korntal-Muenchingen, all of Fed. Rep. of Germany

[73] Assignee: Robert GmbH Bosch, Stuttgart, Fed. Rep. of Germany

[21] Appl. No.: 404,474

[22] Filed: Sep. 8, 1989

[30] Foreign Application Priority Data

Nov. 4, 1988 [DE] Fed. Rep. of Germany ....... 3837419

[51] Int. Cl.$^5$ .................... B60T 13/16; B60T 17/02
[52] U.S. Cl. .................... 303/10; 417/363; 303/116
[58] Field of Search .................... 303/116, 10–12, 303/113, 114, 119; 417/363, 360, 361

[56] References Cited

U.S. PATENT DOCUMENTS

| | | | |
|---|---|---|---|
| 2,928,961 | 3/1960 | Morrill | 417/363 X |
| 3,663,002 | 5/1972 | Gergle et al. | 267/136 |
| 4,104,007 | 8/1978 | Hehl | 417/360 |
| 4,421,359 | 12/1983 | Hayashi et al. | 303/116 X |
| 4,790,729 | 12/1988 | Zirps | 417/363 |
| 4,807,945 | 2/1989 | Budecker et al. | 303/116 X |
| 4,887,870 | 12/1989 | Siegel | 303/116 |
| 4,904,026 | 2/1990 | Bernhardt et al. | 303/10 |

FOREIGN PATENT DOCUMENTS

| | | | |
|---|---|---|---|
| 0214283 | 9/1987 | Japan | 417/363 |
| 0214286 | 9/1987 | Japan | 417/363 |

Primary Examiner—Douglas C. Butler
Attorney, Agent, or Firm—Edwin E. Greigg

[57] ABSTRACT

The invention relates to a brake device for a hydraulic vehicle brake system. In this device, a return feed pump located in a feed pump housing is supported at several points between an assembly housing and a fastening plate and is movable relative to the other components. The mounting is done by screws resting in bearing tubes, the screws being surrounded by elastic damping sleeves in order to enable the elastic mobility of the feed pump housing. The line connections between the feed pump housing and the assembly housing are made by small connecting tubes resting in housing bores in the feed pump housing on one side and in the assembly housing on the other. The through bore extending through the feed pump housing in this region is sealed off on the side of the feed pump housing opposite the small connecting tubes by bolts, which with their part remote from the feed pump housing rest on the fastening plate.

18 Claims, 3 Drawing Sheets

BRAKE DEVICE FOR A HYDRAULIC VEHICLE BRAKE SYSTEM

BACKGROUND OF THE INVENTION

The invention relates to a brake device for a hydraulic vehicle brake system as defined herein.

Brake devices of this type include an electrohydraulic actuating assembly and a return feed pump and are mounted in the engine compartment of the vehicle body. Considerable noise is generated because of variable feed quantities in the return feed pump. To decouple structure-borne sound, the pump is therefore suspended from the housing by elastic mounts, with both structural parts movable relative to one another. The suction and pressure connection lines between the two parts of the housing must therefore be embodied in such a way that the mobility of the return feed pump inside the elastic mount is assured.

U.S. Pat. No. 4,790,729 discloses a brake device of this type, in which small connecting tubes in housing bores extend between the fastening plate and the feed pump and between the feed pump and the assembly housing. A disadvantage of this arrangement is that the connecting lines must be sealed off at more than one transition. Moreover, the through bore extending both through the assembly and feed-pump housing and through the fastening plate must be sealed off with a sealing cap at its end in the fastening plate. Securing the pump suspension in case the damping elements fail is provided for, in this arrangement, by two pins fitted into the assembly housing and anchored in both the assembly housing and the fastening plate. Finally, in this brake device there is also the danger, in the event of failure of the damping elements, that the small connecting tubes can slide out of the bores and thus leak.

OBJECT AND SUMMARY OF THE INVENTION

In a brake device of the type described above, both simple mounting and a reduction in the number of sealing points are attained with the characteristics of the body as set forth herein.

Because the bearing tubes extending between the fastening plate and the assembly housing are braced with screws or stay bolts, a particularly simple mounting is assured. In particular, because of the novel means of suspending the pump, fewer individual parts are needed. In the event that the damping elements fail, the braced tubes also perform a safety function. They prevent the small connecting tubes from sliding out of the bores and leaking.

Since the through bore extending through the assembly housing and the feed pump housing in the vicinity of the small connecting tubes is closed off by a bolt located in a bored-out recess in the feed pump housing, it is no longer necessary for the sake of elasticity to install further small connecting tubes between the feed pump housing and the fastening plate. Because of the embedded bolts, a seal is created that makes it possible to dispense with further sealing elements. Despite this modification, the pump housing is not subjected to a hydraulic reaction force. With the provisions recited, advantageous improvements to and modifications of the brake device disclosed are possible.

An advantageous embodiment of the invention is attained particularly with the characteristics set forth. Because the bearing tube extending through the middle of the feed pump housing is surrounded by a jacket face dished toward its middle, the damping sleeve simultaneously acts as a bearing sleeve. This sleeve accommodates the relative mobility of the feed pump with respect to the other parts and makes the elasticity of the motions of the feed pump housing possible. The brake device is advantageously embodied such that the feed pump vibration is limited and damped, by the provision of two opposite bearing tubes disposed in the outer region of the feed pump housing, with damping sleeves slipped with flanges onto the face ends of the bearing tubes, the flanges engage the decoupling chambers located between the fastening plate and the feed pump housing on the one hand and between the feed pump housing and the assembly housing on the other.

In a particularly advantageous feature of the invention, the bolts opposite the small connecting tubes in the feed pump housing rest with their part oriented toward the fastening plate on a damping element located on the fastening plate; this damping element comprises a plate of plastic or the like and an elastic element connected to it. Once again, the condition of elasticity of the mounting of the feed pump housing is provided for, while at the same time the aspect of sealing of the through bore extending through the feed pump housing is also taken into account.

An advantageous embodiment of the invention is defined in particular by the structure set forth herein. Because the screws are introduced into the assembly housing through both the fastening plate and the feed pump housing, a durable connection of the structural parts to one another is attained, and installation is facilitated substantially, which contributes to a reduction in the total production cost.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
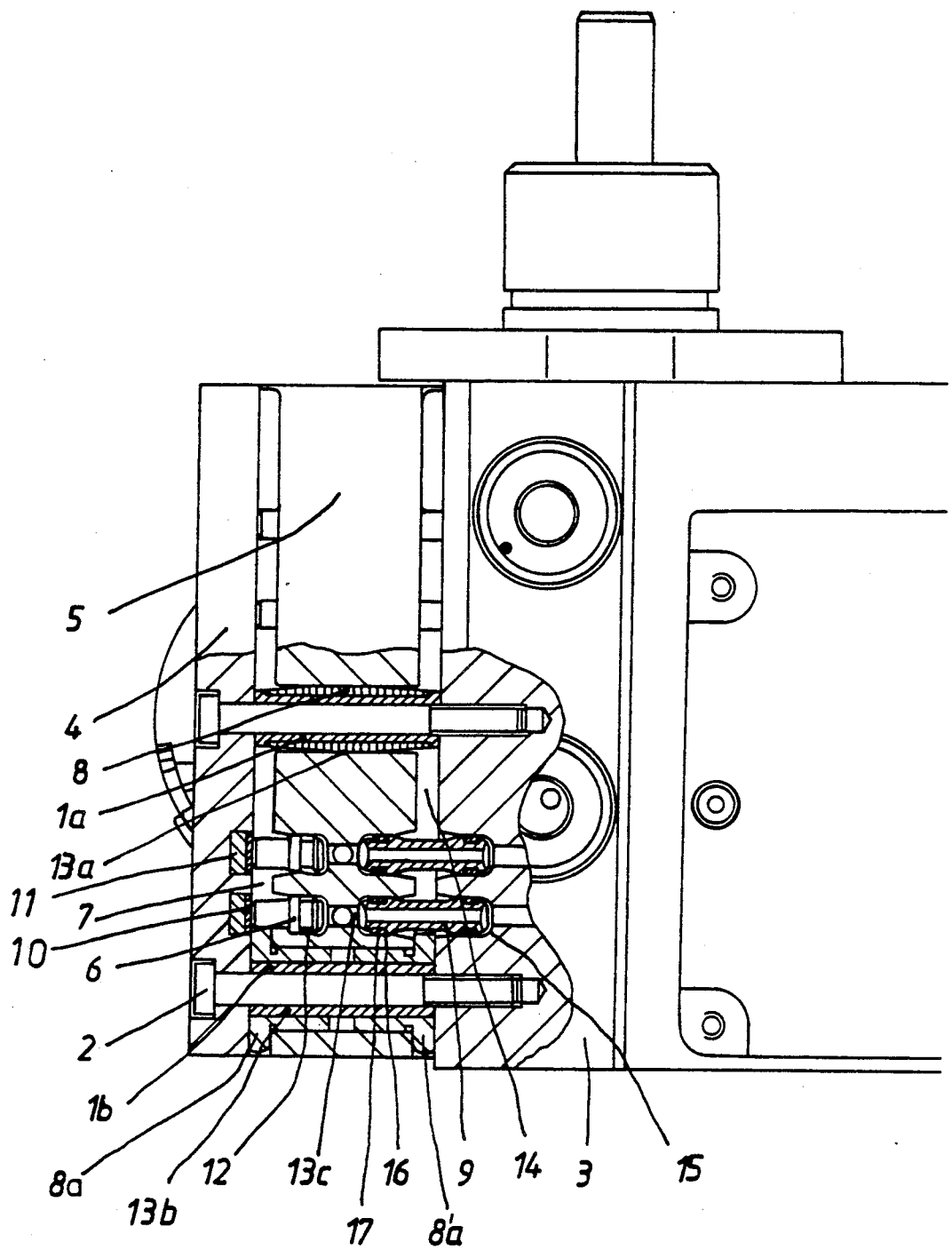
FIG. 1 is a plan view of the brake device according to the invention, part of which is shown in section.
Figure 2:
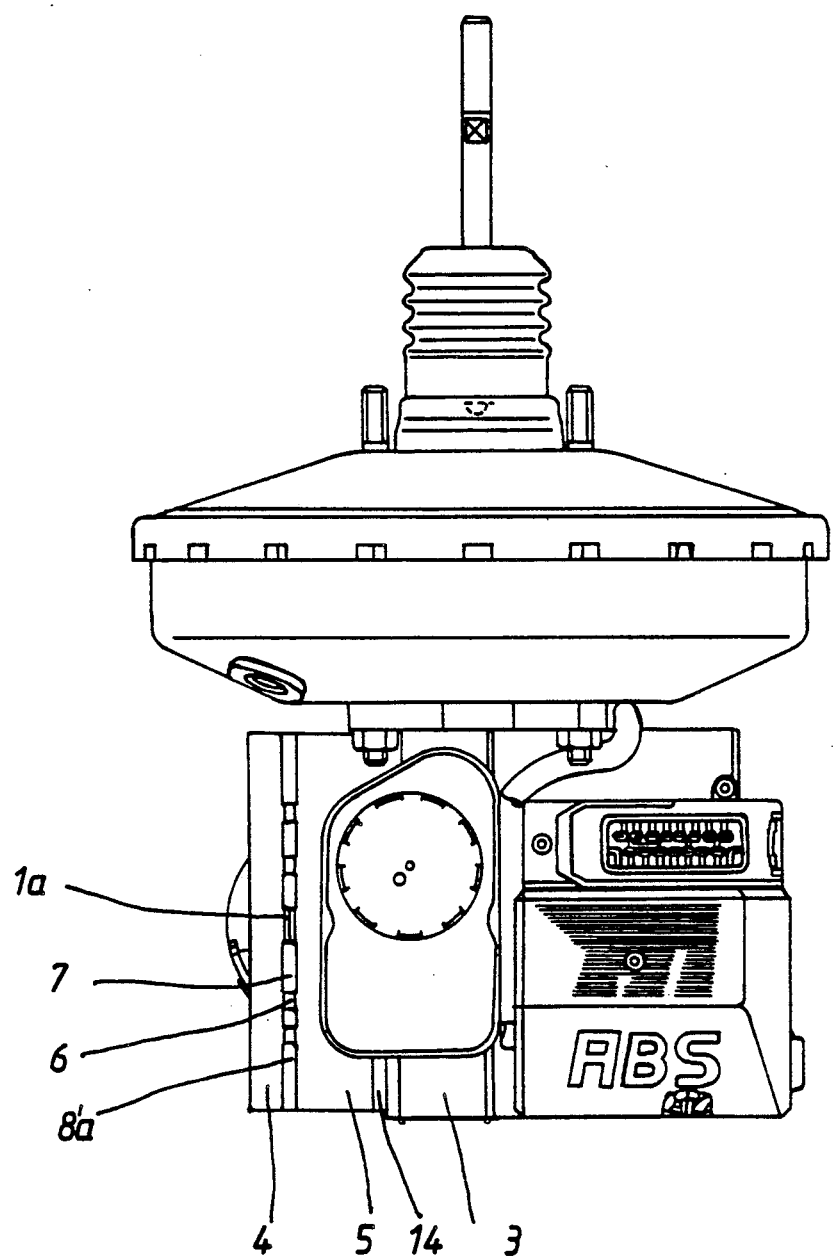
FIG. 2 is a plan view of the brake device according to the invention.
Figure 3:
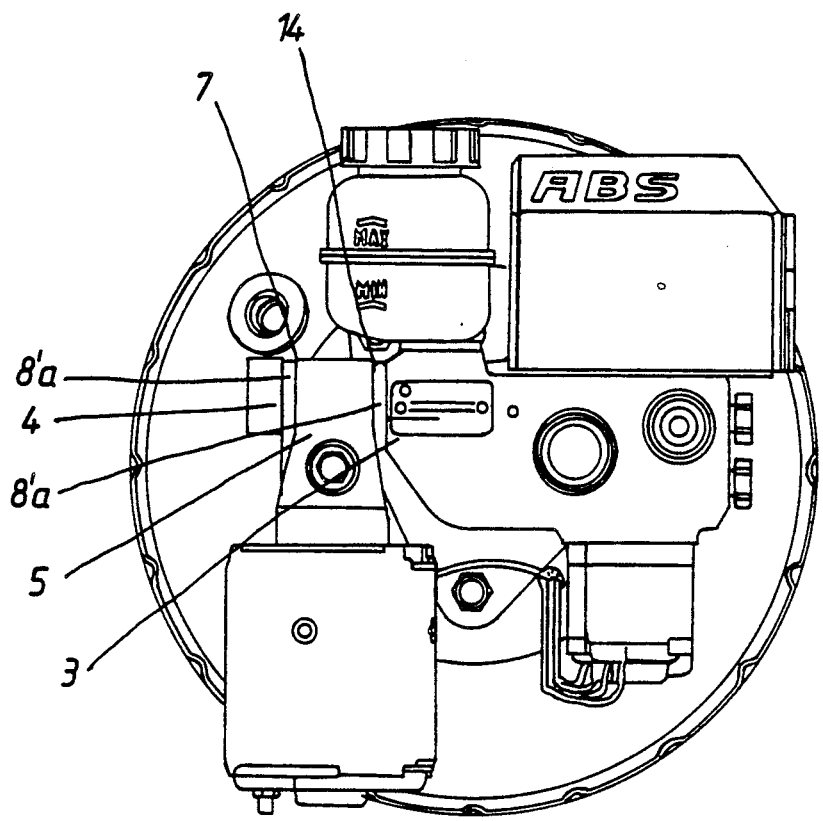
FIG. 3 is a front view of the brake device according to the invention.

The brake device shown in FIGS. 1-3 is intended for use in a hydraulic dual-circuit brake system for a motor vehicle, which is equipped with an anti-lock system or ABS. The brake device is an integral component of the anti-lock system, which includes an electronic regulator and four wheel sensors that in a known manner detect the rpm of the individual wheels and furnish electrical signals accordingly to the electronic regulator. The brake device includes an actuation assembly and a feed pump. These components are mounted on a fastening plate and are movable relative to one another.

The plan view shown partly in section in FIG. 1 shows the feed pump housing 5, attached to a fastening plate 4, and an assembly housing 3 communicating with the feed pump housing. The feed pump is supported at several points between the fastening plate 4 and the assembly housing 3 by bearing tubes 1a, and 1b. The bearing tubes 1a, 1b comprise spacer tubes, which extend between the assembly housing 3 and the fastening plate 4 in through bores 13a, and 13b of the feed pump housing 5 and are secured by means of screws or stay bolts 2. The bearing tube 1a extending centrally through the feed pump housing 5 is surrounded by a damping sleeve 8, which is curved toward its middle. In the outer region of the feed pump housing 5, two further bearing tubes 1b are provided, only one of which, however, is visible in the section of the drawing. On their respective face ends, damping sleeves 8a each of which is provided with a flange 8'a are also slipped on. Each flange 8'a engages a respective decoupling chamber 7, 14 located between the fastening plate 4 and the feed pump housing 5 on the one hand, and between the feed pump housing 5 and the assembly housing 3 on the other.

The decoupling chamber 14 located between the feed pump housing 5 and the assembly housing 3 is spanned by small connecting tubes 9 resting in aligned housing bores 15 of both the feed pump housing 5 and the assembly housing 3. The small connecting tubes are thickened spherically near both face ends, and for sealing off the housing bores 15 are provided with a sealing ring 17 resting in an external groove 16 of each thickened part. The through bore 13c extending onward, although with a smaller diameter, through the feed pump housing from the housing bore 15 is sealed off, on the side of the feed pump housing 5 opposite the small connecting tube 9, by bolts 6, which likewise rest in a bored-out recess 12 in the housing. With their portion oriented toward the fastening plate 4, the bolts 6 rest on the fastening plate 4. In this region, a damping element, comprising a plate 10 of plastic or the like and an element 11 of elastic material resting on the plate 10, is attached secured in a bore in the fastening plate 4.

The view of the brake device according to the invention shown in FIG. 2 illustrates the position of the assembly housing 3, feed pump housing 5 and fastening plate 4 in the overall housing. In the decoupling chamber 7 located between the fastening plate 4 and the feed pump housing 5, the parts of the bolts 6 resting on the fastening plate 4 can be seen. The bearing tube 1a can also be seen in this drawing. The damping sleeve partly surrounding the bearing tubes 1b, the flanges 8'a of which engage the face ends of the bearing tubes in the decoupling chamber 7 located between the fastening plate 4 and the feed pump housing 5 and in the decoupling chamber 14 located between the feed pump housing 5 and the assembly housing 3 can also be seen in the drawing, in its flanged portion 8'a.

In the view of the brake device according to the invention shown in FIG. 3, which is a view from the front, the flange 8'a of the damping sleeve is again visible, located in the decoupling chambers 7, 14 between the fastening plate 4 and the feed pump housing 5 and the assembly housing 3 decoupled from the feed pump housing 5. Other essential features of the invention, are accommodated in the components comprising the fastening plate 4, feed pump housing 5 and assembly housing 3, and hence are not visible in the drawing.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A brake device for a hydraulic vehicle brake system, which comprises a feed pump housing, an assembly housing attached elastically to said feed pump housing, said feed pump housing and said assembly housing form two components which communicate with one another by means of at least one suction and pressure line, which are embodied as housing bores in both components and in which at least one pivotable and longitudinally displaceable small connecting tube rests in two bearing bores, aligned with one another in both components, said feed pump housing (5) has through bores (13a, 13b), through which bearing tubes (1a, 1b) surrounded by damping, elastic material extend, which bearing tubes are secured by means of screws or stay bolts (2) between the assembly housing (3) and a fastening plate (4), on which rest bolts (6) that protrude into the feed pump housing (5), said bearing tube (1a) is disposed in a middle portion of the feed pump housing (5) and is surrounded by a damping sleeve (8) having a jacket face that is dished or thickened toward the middle.

2. A brake device as defined by claim 1, which includes two opposed bearing tubes (1b) disposed in an outer region of the feed pump housing (5), said two opposing bearing tubes includes two face ends onto which damping sleeves (8a) with flanges (8'a) are slipped, said flanges (8'a) each engage respective decoupling chambers (7, 14) located on one side between the fastening plate (4) and the feed pump housing (5) and on the other side between the feed pump housing (5) and the assembly housing (3).

3. A brake device as defined by claim 2, in which said damping sleeves (8a) comprise elastic material, such as rubber or the like.

4. A brake device as defined by claim 3, in which said bolts (6) are located opposite small connecting tubes (9) in said feed pump housing (5), and said bolts (6) rest with a portion oriented toward the fastening plate (4) on a damping element located on the fastening plate (4), which damping element comprises a plate (10) of plastic or the like and an elastic element (11) joined to it.

5. A brake device as defined by claim 2, in which said bolts (6) are located opposite small connecting tubes (9) in said feed pump housing (5), and said bolts (6) rest with a portion oriented toward the fastening plate (4) on a damping element located on the fastening plate (4), which damping element comprises a plate (10) of plastic or the like and an elastic element (11) joined to it.

6. A brake device as defined by claim 2, which includes bolts (6) that rest with a portion oriented toward small connecting tubes (9) in a bore (12) of the feed pump housing part (5).

7. A brake device as defined by claim 1, which includes bolts (6) that rest with a portion oriented toward small connecting tubes (9) in a bore (12) of the feed pump housing part (5).

8. A brake device for a hydraulic vehicle brake system, which comprises a feed pump housing, an assembly housing attached elastically to said feed pump housing, said feed pump housing and said assembly housing form two components which communicate with one another by means of at least one suction and pressure line, which are embodied as housing bores in both components and in which at least one pivotable and longitudinally displaceable small connecting tube rests in two bearing bores, aligned with one another in both components, said feed pump housing (5) has through bores (13a, 13b), through which bearing tubes (1a, 1b) surrounded by damping, elastic material extend, which bearing tubes are secured by means of screws or stay bolts (2) between the assembly housing (3) and a fastening plate (4), on which rest bolts (6) that protrude into the feed pump housing (5), said bearing tubes (1a, 1b) comprise spacer tubes, through which the screws or stay bolts (2) extend, and bearing tube (1a) is disposed in a middle portion of the feed pump housing (5) and is surrounded by a damping sleeve (8) having a jacket face that is dished or thickened toward the middle.

9. A brake device as defined by claim 8, which includes two opposed bearing tubes (1b) disposed in an outer region of the feed pump housing (5), said two opposing bearing tubes include two face ends onto which damping sleeves (8a) with flanges (8'a) are slipped, said flanges (8'a) each engage respective decoupling chambers (7, 14) located on one side between the fastening plate (4) and the feed pump housing (5) and on the other side between the feed pump housing (5) and the assembly housing (3).

10. A brake device as defined by claim 9, in which said damping sleeves (8a) comprise elastic material, such as rubber or the like.

11. A brake device for a hydraulic vehicle brake system, which comprises a feed pump housing, an assembly housing attached elastically to said feed pump housing, said feed pump housing and said assembly housing form two components which communicate with one another by means of at least one suction and pressure line, which are embodied as housing bores in both components and in which at least one pivotable and longitudinally displaceable small connecting tube rests in two bearing bores, aligned with one another in both components, said feed pump housing (5) has through bores (13a, 13b), through which bearing tubes (1a, 1b) surrounded by damping, elastic material extend, which bearing tubes are secured by means of screws or stay bolts (2) between the assembly housing (3) and a fastening plate (4), on which rest bolts (6) that protrude into the feed pump housing (5), said bolts are located opposite small connecting tubes (9) in said feed pump housing (5), and said bolts (6) rest with a portion oriented toward the fastening plate (4) on a damping element located on the fastening plate (4), which damping element comprises a plate (10) of plastic or the like and an elastic element (11) joined to it.

12. A brake device as defined by claim 11, in which said feed pump has one through bore (13c) each in a vicinity of the small connecting tubes (9) and in the vicinity of the bolts opposite them.

13. A brake device for a hydraulic vehicle brake system, which comprises a feed pump housing, an assembly housing attached elastically to said feed pump housing, said feed pump housing and said assembly housing form two components which communicate with one another by means of at least one suction and pressure line, which are embodied as housing bores in both components and in which at least one pivotable and longitudinally displaceable small connecting tube rests in two bearing bores, aligned with one another in both components, said feed pump housing (5) has through bores (13a, 13b), through which bearing tubes (1a, 1b) surrounded by damping, elastic material extend, which bearing tubes are secured by means of screws or stay bolts (2) between the assembly housing (3) and a fastening plate (4), on which rest bolts (6) that protrude into the feed pump housing (5), said bearing tubes (1a, 1b) comprise spacer tubes, through which the screws or stay bolts (2) extend, and said bolts (6) are located opposite small connecting tubes (9) in said feed pump housing (5), and said bolts (6) rest with a portion oriented toward the fastening plate (4) on a damping element located on the fastening plate (4), which damping element comprises a plate (10) of plastic or the like and an elastic element (11) joined to it.

14. A brake device for a hydraulic vehicle brake system, which comprises a feed pump housing, an assembly housing attached elastically to said feed pump housing, said feed pump housing and said assembly housing form two components which communicate with one another by means of at least one suction and pressure line, which are embodied as housing bores in both components and in which at least one pivotable and longitudinally displaceable small connecting tube rests in two bearing bores, aligned with one another in both components, said feed pump housing (5) has through bores (13a, 13b), through which bearing tubes (1a, 1b) surrounded by damping, elastic material extend, which bearing tubes are secured by means of screws or stay bolts (2) between the assembly housing (3) and a fastening plate (4), on which rest bolts (6) that swingingly protrude into the feed pump housing (5) and are provided with a single sealing ring, and said bolts (6) rest with a portion oriented toward and in axial alignment with small connecting tubes (9) which are swingingly disposed in a bore (12) of the feed pump housing part (5), and includes a sealing ring surrounding each end thereof.

15. A brake device as defined by claim 14, in which said feed pump has one through bore (13c) each in a vicinity of the small connecting tubes (9) and in the vicinity of the bolts opposite them.

16. A brake device as defined by claim 14, in which said stay bolts (2) are introduced into the assembly housing (3) through both the fastening plate (4) and the feed pump housing (5).

17. A brake device as defined by claim 16, in which said bolts (6) are located opposite small connecting tubes (9) in said feed pump housing (5), and said bolts (6) rest with a portion oriented toward the fastening plate (4) on a damping element located on the fastening plate (4), which damping element comprises a plate (10) of plastic or the like and an elastic element (11) joined to it.

18. A brake device for a hydraulic vehicle brake system, which comprises a feed pump housing, an assembly housing attached elastically to said feed pump housing, said feed pump housing and said assembly housing form two components which communicate with one another by means of at least one suction and pressure line, which are embodied as housing bores in both components and in which at least one pivotable and longitudinally displaceable small connecting tube rests in two bearing bores, aligned with one another in both components, said feed pump housing (5) has through bores (13a, 13b), through which bearing tubes (1a, 1b) surrounded by damping, elastic material extend, which bearing tubes are secured by means of screws or stay bolts (2) between the assembly housing (3) and a fastening plate (4), on which rest bolts (6) that swingingly protrude into the feed pump housing (5) and is provided with a single sealing ring, said bearing tubes (1a, 1b) comprise spacer tubes, through which the screws or stay bolts (2) extend, and said bolts (6) rest with a portion oriented toward small connecting tubes (9) which are swingingly disposed in a bore (12) of the feed pump housing part (5), and include a sealing ring surrounding each end thereof.

* * * * *